(No Model.)

N. BORODOULIN.
APPARATUS FOR MEASURING THE DENSITY OF LIQUIDS.

No. 288,402. Patented Nov. 13, 1883.

WITNESSES,
Albert Popkins.
Harry Drury.

INVENTOR
Nicholas Borodoulin
by his attorneys
Howson and Sons

UNITED STATES PATENT OFFICE.

NICHOLAS BORODOULIN, OF KHARKOV, RUSSIA.

APPARATUS FOR MEASURING THE DENSITY OF LIQUIDS.

SPECIFICATION forming part of Letters Patent No. 288,402, dated November 13, 1883.

Application filed June 11, 1883. (No model.)

*To all whom it may concern:*

Be it known that I, NICHOLAS BORODOULIN, a subject of the Czar of Russia, and residing in Kharkov, Russia, have invented certain Improvements in Self-Acting Apparatus for Ascertaining the Density of Liquids, of which the following is a specification.

My invention consists of an apparatus for automatically indicating the density of liquids, and is based on the principle that when a pivoted lever carrying two floats of equal volume but of different weights, or of different weights and volumes, are immersed in liquids of different density passed through the containing-casing, a more or less considerable deviation of the lever will be observed, owing to the alteration in the ratio of the respective weights of the floats. Thus, by the angle of deviation of the said lever, the density of the liquid to be tested may be readily ascertained. The relation between the density of the liquids and the angle of deviation of the lever is expressed by tangents of the angle, and these tangents are in direct proportion of the ratios of the weights of the floats. The apparatus is thus in the nature of a hydrostatic balance, and I term it "Tangent Areometer."

Figure 1:
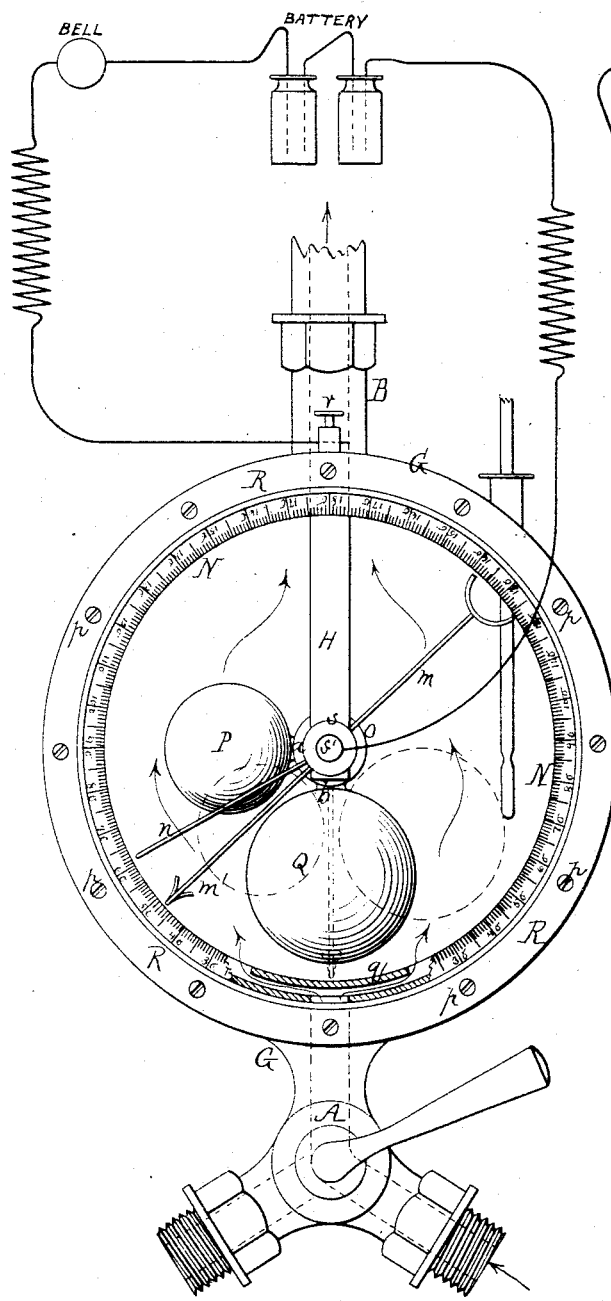
Figure 2:
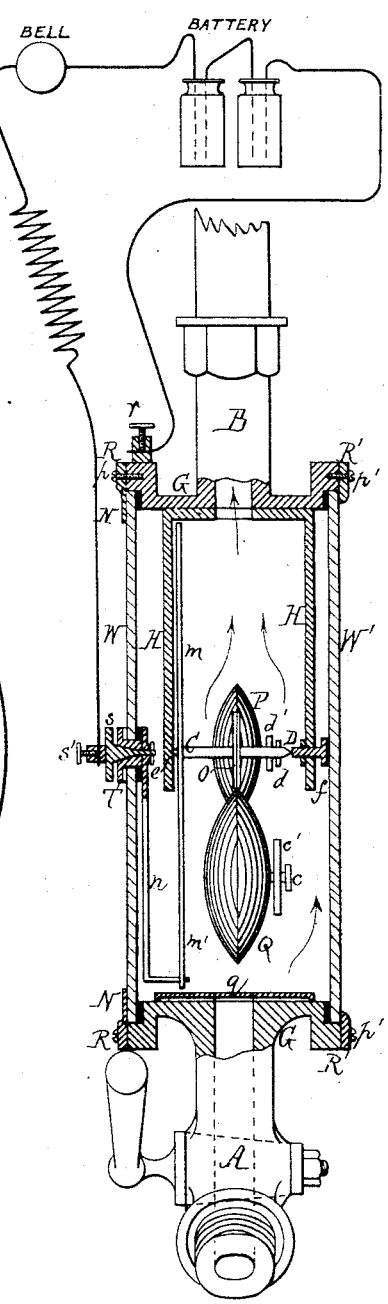

In the accompanying drawings, Figure 1 is a front view of the apparatus, partly in section, and with the electric circuit indicated in diagram; and Fig. 2 is a vertical section of the same, also with the electric circuit in diagram.

G is a cylindrical casing closed at the front and back by glass plates W W', adapted to annular grooves in the edges of the casing, and secured by rings R R' and screws $p$ $p'$, and suitable packing to insure a tight joint. Between the ring R and glass plate W is secured a graduated ring, N, for a purpose explained hereinafter.

The inclosure formed by the casing and its plates is provided with a valved inlet, A, near the bottom, and a suitable outlet, B, near the top, a guard-plate, $q$, being placed over the inlet to check and equalize the flow of liquid entering the casing.

To the upper part of the casing are fixed two pendent arms, H H, carrying bearings $e$ $f$ for the conical ends of the central axis, C D. The bearing $f$ is an adjustable screw, by turning which the axis and its parts can be readily released and removed. On the same axis, C D, is secured a disk, O, with arms $a$ $b$, to which are fixed the two lenticular floats P Q, of different weights or of different volumes and weights.

The disk O, arms, and floats form a bent lever, with an angle preferably of about ninety degrees. To each float is secured a screw-rod, $c$, ($d$,) for the reception of such additional weights, $c'$, ($d'$,) as the density of the liquid to be measured may demand.

On the axis C D is also mounted a pointer, $m$ $m'$, which serves, in connection with the graduated ring N, to indicate the deviations of the floats, the graduations being such as to indicate by that means the degree of density of the liquid passing through the vessel.

I prefer to combine with my apparatus an alarm to give a signal when the liquid passing through the vessel reaches a given density. In the center of the plate W is a thimble, T, with a central conical opening, to which is adapted a corresponding conical plug, $s$, having fixed to its inner end a contact-finger, $n$, projecting into the path of the pointer $m$ $m'$. This plug $s$ is provided with a binding-post, $s'$, connected with one pole of a battery, the other pole being connected to a binding-post, $r$, on the casing. The circuit includes a suitable call-bell at the desired point, so that, the finger $n$ having been adjusted to the proper position, when the pointer $m$ $m'$ indicates the corresponding degree of density of liquid in the vessel, the said pointer will have come into contact with the finger $n$ and closed the circuit to cause the alarm.

The dimensions of the apparatus may be varied according to convenience; but for ordinary purposes I prefer to make the volume of the float P equal to about one hundred cubic centimeters, and that of the float R about two hundred cubic centimeters. The weights of the respective floats will depend in a measure on the lowest and highest limits of the density of the liquid to be tested. For instance, if the apparatus is designed to determine the density of beet-root or sugar-cane juice containing sugar within the limits of one per cent. to fifteen per cent., then the weight of the float whose volume is equal to one hundred cubic centimeters should be equal to one hundred grams, while the weight of the float Q, having a volume equal to two hundred cubic centimeters, must be equal to two hundred and six grams.

The dial-plate N is graduated symmetrically to the right and left of a central vertical line, the zero-mark being at a position indicated by dotted lines taken by the pointer when water is passed through the vessel. When a liquid having a specific gravity greater than water is passed through the vessel, the floats will move the pointer to the left, while when liquid lighter than water is passed through the pointer will be moved to the right.

It will be understood that the apparatus may also be employed for ascertaining the density of vapors and gases by making the floats of suitable size and materials, the one essential condition being that the weight of one of the floats should be equal to zero.

I claim as my invention—

1. An apparatus for measuring the density of fluids, said apparatus consisting of a vessel with inlet and outlet for the fluid, and a pivoted lever carrying two floats of different weight, or of different volume and weight, within the vessel, and means for indicating the angle of deviation of said lever, substantially as set forth.

2. The combination of a casing and graduated scale with an axis adapted to bearings within said casing, and carrying a pointer, and two floats of different weight or of different volumes and weights, substantially as set forth.

3. The combination of a casing, having a glass front plate and graduated scale and inlet and outlet, with pendent legs H, axis mounted in bearings therein, and carrying a pointer, and two floats, P Q, within the casing, substantially as described.

4. The combination of an electric-alarm circuit and adjustable contact-finger $n$ with a casing, a pivoted lever carrying two floats within the casing, and a pointer operated by the lever and adapted to come into contact with the finger to complete the circuit.

In testimony whereof I have signed my name to this specification in the presence of two subscribing witnesses.

NICHOLAS BORODOULIN.

Witnesses:
FREDERICK KAUPE,
NICHOLAS TSCHEKALOFF.